United States Patent [19]

Shenk

[11] 4,336,987
[45] Jun. 29, 1982

[54] CAMERA EMPLOYING ZONE FOCUSING

[75] Inventor: Edwin K. Shenk, Westford, Mass.

[73] Assignee: Polaroid Corporation, Cambridge, Mass.

[21] Appl. No.: 218,813

[22] Filed: Dec. 22, 1980

[51] Int. Cl.³ .............................................. G03B 3/10
[52] U.S. Cl. .................................................. 354/195
[58] Field of Search ...................... 354/25, 195, 198; 352/140

[56] References Cited

U.S. PATENT DOCUMENTS

| | | | |
|---|---|---|---|
| 3,522,764 | 8/1970 | Biber et al. | 354/195 |
| 4,010,479 | 3/1977 | Nobusawa | 354/25 |
| 4,124,858 | 11/1978 | Erlichman | 354/200 |
| 4,178,087 | 12/1979 | Shenk et al. | 354/195 |
| 4,182,563 | 1/1980 | Biber et al. | 354/197 |
| 4,199,244 | 4/1980 | Shenk | 354/195 |
| 4,199,246 | 4/1980 | Miggli | 354/195 |
| 4,230,401 | 10/1980 | Tokutomi et al. | 354/25 |

*Primary Examiner*—Michael L. Gellner
*Attorney, Agent, or Firm*—David R. Thornton

[57] ABSTRACT

A camera having a displaceable lens includes a lens position sensor and a converter for converting the sensor output into a representation of the in-focus distance associated with that lens position. The in-focus distance of the lens is then compared to the distance of the subject as determined by a rangefinder (e.g., an ultrasonic rangefinder). A visual indication is provided in the viewfinder prompting the user to manually change the position of the lens in a direction that improves the focus or, alternately, the relationship is used for controlling a motor to move the lens to a position at which the subject is in focus.

28 Claims, 6 Drawing Figures

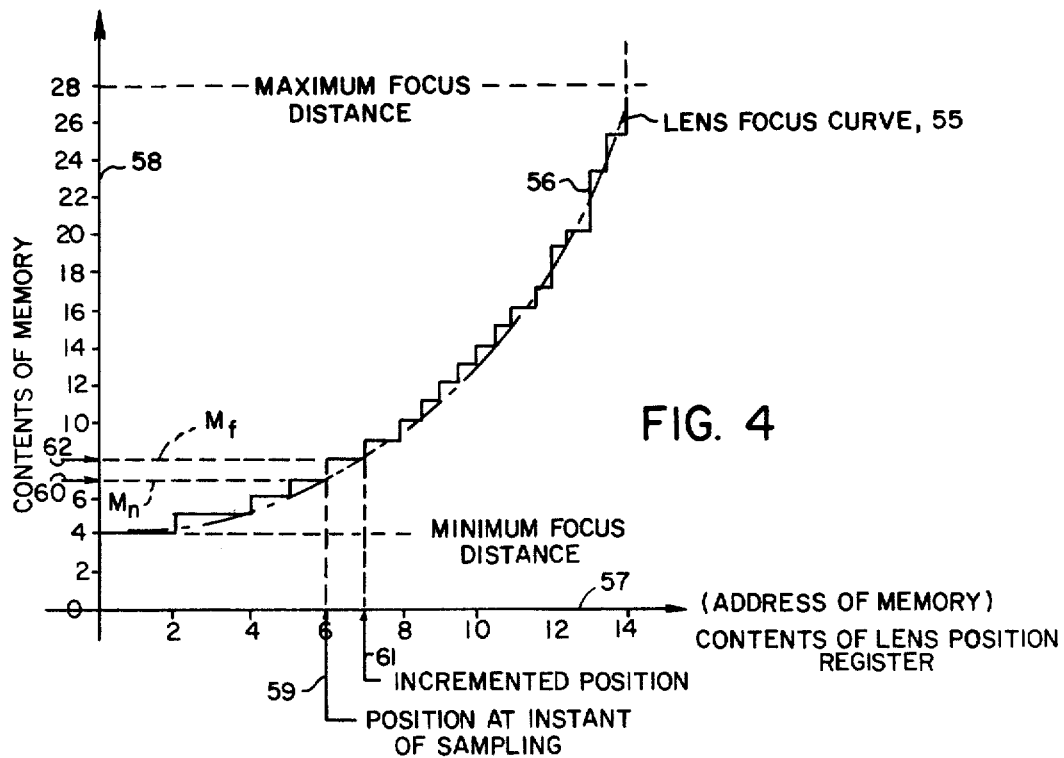

४,३३६,९८७

CAMERA EMPLOYING ZONE FOCUSING

BACKGROUND OF THE INVENTION

1. Field of the Invention

This invention relates to apparatus and method for facilitating the focusing of a camera having a displaceable lens whose position at which a subject is in focus is a predetermined function of subject distance.

2. Description of the Prior Art

Professional photographers usually utilize a camera with interchangeable, high quality lenses that allow the photographer the flexibility of choosing a lens suitable for the subject matter being photographed. Usually, an optical rangefinder is used by such photographers to adjust the position of the lens mount until the subject is properly focused. By accurately measuring the level of scene brightness and selecting a suitable diaphragm size and shutter speed, a sharply focused and properly exposed photograph will be obtained.

Not only does such an arrangement require manual ranging with its operator determination of range, but further it is very difficult and time consuming to use an optical rangefinder to accurately focus on the subject at low scene light levels because of the difficulty in clearly seeing the poorly illuminated subject. Consequently, photographs with less than desired image sharpness are sometimes obtained. Heretofore, short of adequately illuminating the subject to be photographed during focusing or utilizing a camera with an automatic focusing system based on ultrasonic ranging (such as disclosed in U.S. Pat. No. 4,199,244) very little could be done to facilitate proper focusing. Moreover, professional photographers usually prefer to have some manual control over these exposure parameters including focusing. Hence, the provision for rapidly obtaining sharply focused professional photographs, particularly under low ambient light conditions, has proved to be a difficult task.

It is therefore an object of the present invention to provide a new and improved apparatus and method for facilitating camera focusing. Another object is to provide an improved apparatus and method for facilitating manual or automatic focusing of photographic apparatus. A still further object is to provide a method and apparatus for automatically indicating the correct focal position while permitting the operator to maintain complete control over focusing.

SUMMARY OF THE INVENTION

Briefly, the method in accordance with the invention comprises determining the lens position, determining the subject distance, converting one of the determinations into a converted factor directly comparable with the remaining determination, comparing the converted factor, repeating the above steps, and indicating the direction of lens movement necessary to bring the lens to its focus position or, alternatively, slowly driving the lens in the indicated direction.

In one illustrated embodiment, a transducer is incorporated into a camera for producing an output that is representative of the instantaneous position occupied by the lens as the photographer manually adjusts the lens during a focusing operation. Such output is applied to a converter for converting the output of the transducer into a representation of the in-focus distance associated with each lens position, the in-focus distance being the distance at which a subject would be in focus when the lens occupies the position represented by the output of the transducer. The in-focus distance of the lens is compared to the actual distance of the subject as determined by a rangefinder (e.g., an ultrasonic rangefinder) to determine the relationship between the actual subject distance and the in-focus distance. Once this determination is made, a visual indicator can be provided in the viewfinder of the camera allowing the user to manually change the position of the lens mount in a direction that improves the focus.

Preferably, the converter produces two outputs respectively representing the minimum and maximum in-focus distance of the lens which establish a focus or focal zone defining near and far boundaries within which the subject must be located in order to be in focus. A comparator produces a signal that operates an indicator of a visual display. The signal produced by the comparator can also be used to control a motor which drives the lens in a direction that will cause the focus zone to shift until the actual subject distance lies within the focus zone boundaries.

BRIEF DESCRIPTION OF DRAWINGS

Embodiments of the invention are shown in accompanying drawings wherein:

FIG. 3 is a chart illustrating the various states of the focus memory shown in FIG. 1;

FIG. 4 shows the functional relationship between the in-focus distance of the lens as a function of lens position, and incorporates the relationship between the address of the memory shown in FIG. 1 and the contents of the memory;

DESCRIPTION OF THE PREFERRED EMBODIMENTS

Figure 1:
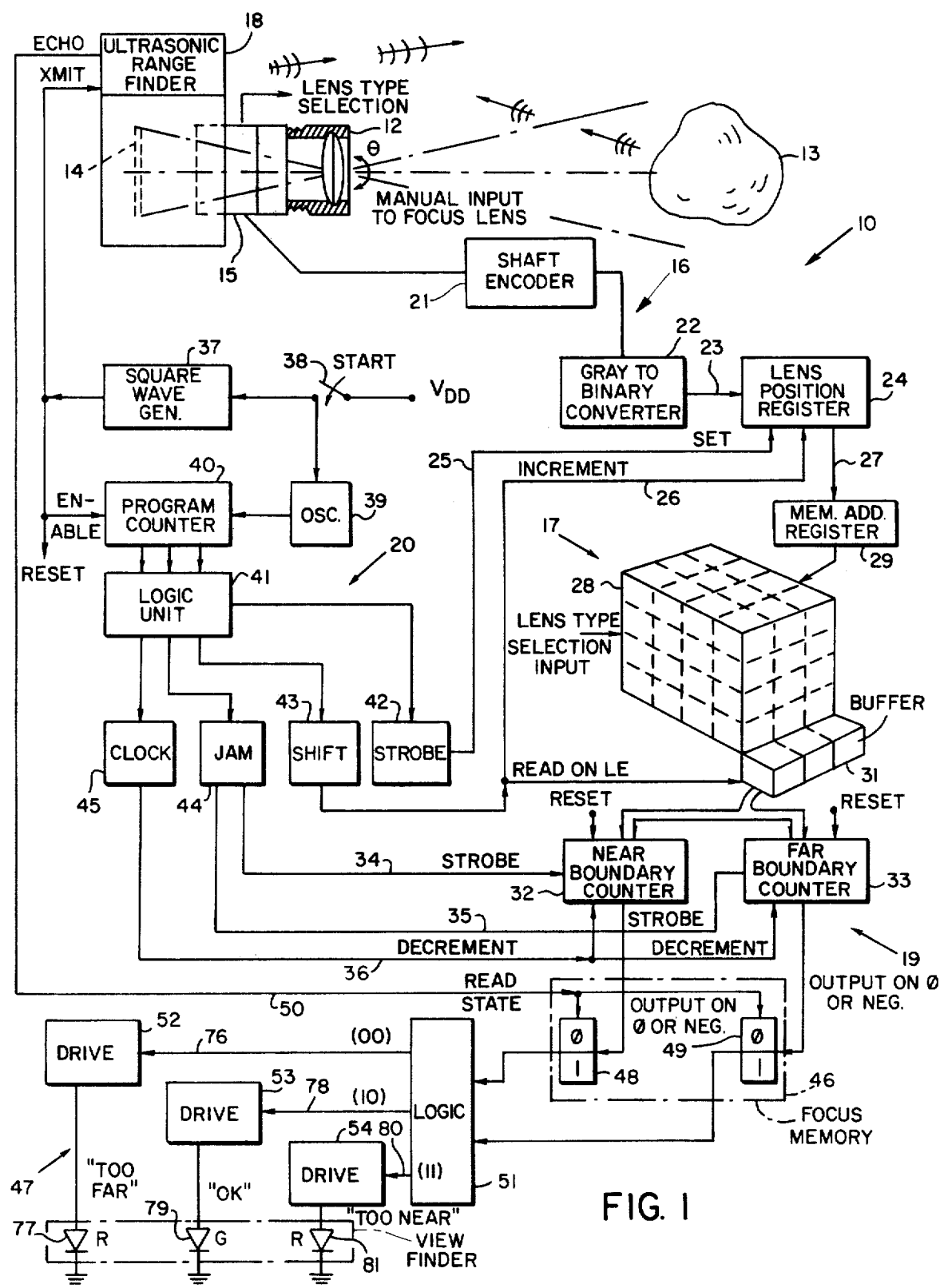
FIG. 1 is a block diagram schematically representing a camera provided in accordance with the present invention.

Referring now to FIG. 1, reference numeral 10 designates a camera apparatus according to the present invention having a displaceable lens mount 12 which can be manually rotated for axial displacement in order to focus an image of a subject 13 on the focal plane 14 within the camera. Lens mount 12 represents any one of a number of interchangeable lenses that can be utilized with camera 10. Consequently, lens mount 12 is releasably attached to mounting block 15 which contains a shaft encoder 21 which, in conjunction with a gray-to-binary converter 22, converts the angular position of the lens mount to a digital signal representative of such angular position. The preferred encoder is one which uses the gray scale. In addition, mounting block 15 also includes a lens type sensor (not shown) cooperable with the various lens mounts that can be attached to the mounting block for the purpose of producing a signal that identifies the particular type of lens mount currently attached to the mounting block.

The main components of the camera 10 are a lens position sensor 16, converter 17, rangefinder 18, comparator device 19, and control circuit 20. Sensor 16 provides means for sensing the position of the lens and includes the shaft encoder 21 mounted in block 15 and the gray-to-binary converter 22 for producing an output on line 23 that represents the current position of the lens mount. That is to say, the actual position of the lens mount at any instant, in binary terms, is provided by the line 23. This portion of the apparatus is entirely conventional.

Sensor 16 also includes lens position register 24 providing a sample-and-hold circuit that stores the output of the position sensor at the instant that register 24 is set by a signal in line 25. The contents of register 24 can be incremented by one when a signal appears on increment line 26. Thus, the output of position sensor 16, which is present in data line 27 from register 24, represents the position of the lens mount. When the quantity in register 24 results from a signal appearing in set line 25, such quantity represents the position of the lens mount at the instant of sampling (i.e., the instant at which the set signal appears in line 25). On the other hand, when the quantity in register 24 results from a signal appearing in increment line 26, such quantity represents an adjacent position of the lens mount spaced a predetermined distance from the position occupied by the lens at the instant that a signal appeared in line 25. With this arrangement, the lens mount 12 may be adjusted, but its position will be frozen in time by reason of signals appearing in lines 25 and 26. In this manner, manual as well as automatic operation of the lens mount can be achieved without interfering with the operation of apparatus 10 which periodically determines the instantaneous and adjacent positions of the lens mount at a suitable sampling rate as described below.

Converter 17 of apparatus 10 is, effectively, a look-up table for converting the output of transducer 16 appearing in data lines 27 to a representation of the in-focus distance associated with the output of the transducer. The in-focus distance is the distance at which a subject will be in focus when the lens mount occupies the position represented by the output of the transducer. In other words, if the quantity in register 24 represents the position of lens mount 12 at the instant of sampling, converter 17 is effective to determine one limit of the focal zone within which a subject will be in focus when the lens mount occupies the position at the instant of sampling.

As later explained in detail, the other limit of the focal zone associated with the sensed lens position is provided by addressing the converter memory 17 with an adjoining count from the position register 24 when the latter is pulsed on line 26. Thus, the converter memory 17 in conjunction with sequential triggering of the position register 24 on lines 25 and 26 provides means for providing a focal zone, or that is, minimum and maximum focal distance limits, associated with the sensed position of the lens.

In its preferred form, the look-up table is a digital memory 28 having memory address register 29 for addressing the various registers of the memory, and having buffer 31 into which the contents of the memory register addressed by register 29 are read when a signal appears in read-line 32. Thus, the output of converter 17 is constituted by the contents of buffer 31 which represent one limit of the in-focus distance associated with the output of sensor 16. The contents of the memory are discussed further below in connection with FIG. 4.

Comparator device 19 comprises first and second storage means or counters, specifically near-boundary counter 32 and far-boundary counter 33 connected in parallel to memory buffer 31. The contents of the buffer are transferred into one or the other of counters 32, 33 when signals appear respectively in strobe lines 34, 35. The purpose of comparator device 19 is to compare the output of rangefinder 18 with the output of converter 17 for determining the relationship between the actual subject distance as determined by the rangefinder and the in-focus distance zone associated with the position occupied by the lens mount at the intant of sampling. The manner in which this is achieved is discussed in detail below.

Rangefinder 18 is preferably an ultrasonic ranging device similar to that disclosed in U.S. Pat. No. 4,199,246. When such a ranging device is triggered, the resultant ultrasonic burst produced is reflected by subject 13 back to a transducer (not shown) which produces an echo pulse a period of time subsequent to transmission of the ultrasonic burst directly proportional to the distance of the subject from the camera. For a distance of about 10 feet from the camera, the echo pulse will be received about 20 msec following transmission of the ultrasonic burst assuming a room temperature environment.

Figure 2:
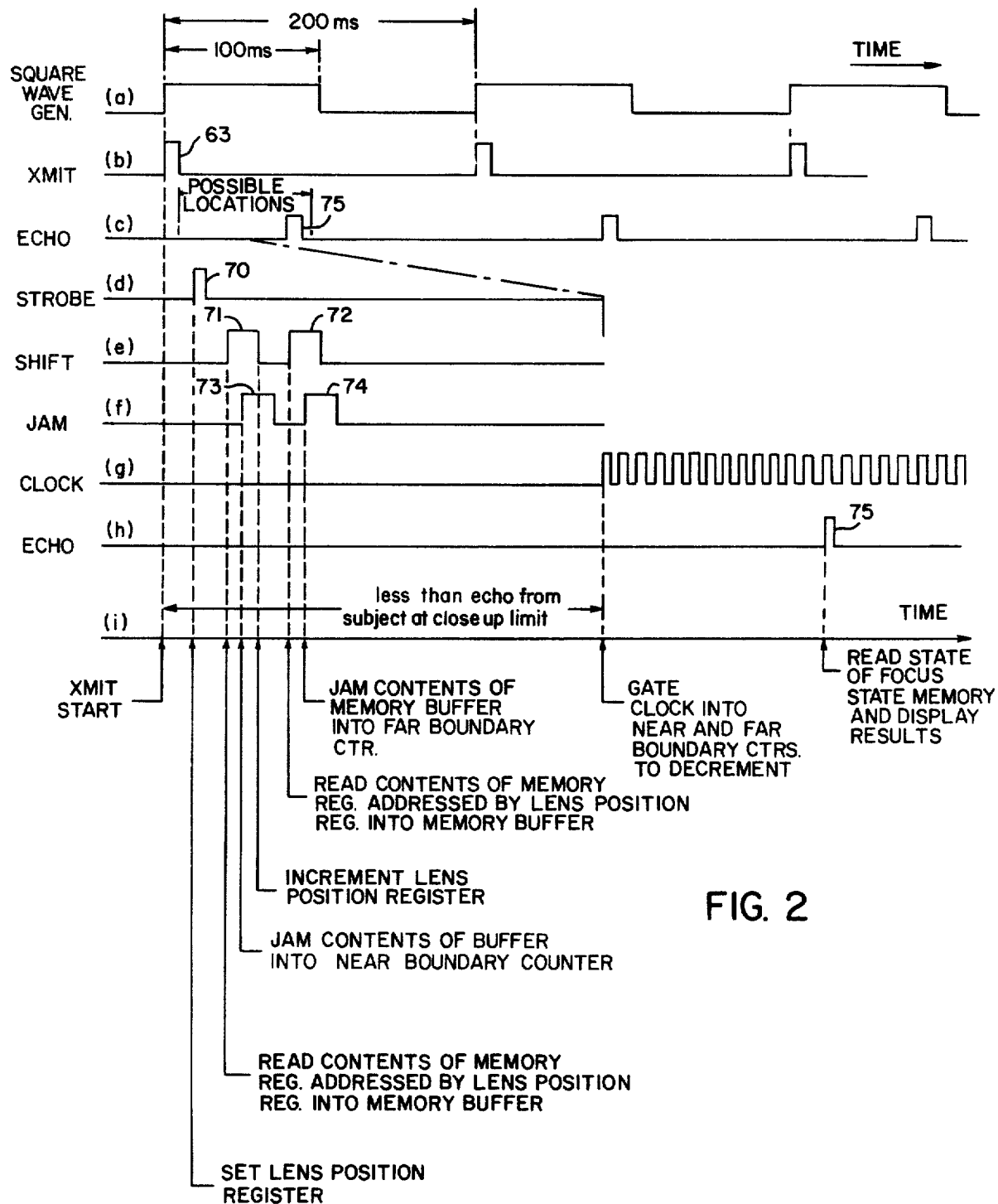
FIG. 2 is a time-sequence diagram showing the wave forms at various locations in the apparatus shown in FIG. 1 and illustrating the method of operation of such apparatus.

In the preferred arrangement shown in FIG. 1, rangefinder 18 is triggered by the output of square wave generator 37 whose operation is initiated when switch 38 is closed. Typically, generator 37 will produce a square wave of about 100 msec duration with a period of about 200 msec. The application of such a wave, which is illustrated in FIG. 2, line (a), will cause rangefinder 18 to transmit an ultrasonic burst on the leading edge of the square wave input to the rangefinder. Thus, about 5 ultrasonic bursts per second will be transmitted by the rangefinder as long as switch 38 remains closed. The triggering signals are indicated in FIG. 2, line (b). An echo from the subject will occur subsequent to each burst in accordance with the range of the subject. Generally speaking, an echo pulse will appear at the transducer of the rangefinder anywhere from 4–60 msec following transmission of the burst. This range is indicated in FIG. 2, line (c).

Referring again to FIG. 1, control circuit 20 includes oscillator 39 whose operation commences when switch 38 is closed and continues as long as the switch remains closed. This oscillator drives a program counter 40 which, in cooperation with logic unit 41 generates the timing signals shown in FIG. 2, lines (d)–(g). Specifically, control circuit 20 has circuits 42–45, as later explained in detail, for the purpose of generating control signals which are applied to sensor 16, converter 17 and comparator device 19.

Finally, apparatus 10 also includes focus memory 46 and indicator apparatus 47. Memory 46 comprises a pair of flip flops 48, 49 each of whose state is determined by the output of counters 32, 33 at the instant an echo pulse appears in line 50. The state of memory 46 is logically considered by logic circuit 51 which powers any single one of drives 52, 53, 54 in accordance with the state of memory 46. Each of the three drives is connected to an LED, preferably located in the viewfinder of the camera.

The contents of memory 28 are selected in accordance with the relationship shown in FIG. 4 to which reference is now made. Chain line 55 in FIG. 4 represents the functional relationship between the in-focus distance of the lens mount and the position of the lens mount. As indicated by curve 55, this relationship is generally non-linear in that the rate of change of position with respect to distance is much greater for subjects close to the camera than for subjects more remote.

Curve 55 is peculiar to a particular interchangeable lens. That is to say, curve 55 is associated with a particular lens; and another lens would have another curve which would be shaped similarly to curve 55 but would not be congruent therewith.

Curve 55 can be approximated by the stair-step curve 56 which permits the lens position and the in-focus distance to be digitized. The arbitrary units shown on the axis 57 represent the contents of lens position register 24 while the arbitrary units on axis 58 represent the in-focus distance for the lens at various positions (i.e., the contents of memory 28).

As indicated previously, the addresses of the registers in memory 28 correspond to the contents of lens position register 24. Each of the registers in memory 28 contains a number representative of a given limit of the in-focus distance for a given lens position. In other words, the memory register at the address specified by pointer 59 (which is associated with a particular position of the lens mount) will contain a number which represents the distance indicated by pointer 60.

In operation of the camera 10, upon closure of switch 38 battery voltage is applied to the circuitry of control circuit 20 as well as to oscillator 39 and square wave generator 37. As indicated above, generator 37 produces a square wave output that is effective to transmit periodic ultrasonic bursts causing subject 13 to reflect these bursts producing a sequence of echos interleaved with the bursts. The operation of apparatus 10 is the same for each burst so that the following explanation, while limited to the events following transmission of a single burst, is applicable to the actual situation where bursts are transmitted periodically.

All of the timing signals produced by control circuit 20 occur within a span of time that is less than the time required for the roundtrip transit of a burst when the subject is located at the closest possible distance to the camera for achieving a focus situation. Shortly after the first burst 63 (see FIG. 2) is transmitted by rangefinder 18, strobe circuit 42 produces strobe pulse 70 which is applied via line 25 to set register 24 with the value determined by the position sensor 22 at that time. That is to say, pulse 70 serves to cause register 24 to sample the output of sensor 22 and to store in register 24 this quantity that represents the position of the lens mount 12 at the instant sampling occurs. Since register 24 operates to sample the position of the lens mount and hold it for processing as described below, the user may actually continue to move the lens mount. For the sake of explanation it is assumed that the lens mount at the instant of pulse 70 occupies the position indicated by pointer 59 in FIG. 4. As a consequence, this information is applied to memory address register 29 through data line 27 so that the memory is addressed by the contents of register 24 at the instant pulse 70 occurs.

Shortly following pulse 70, shift circuit 43 sequentially produces a pair of pulses 71, 72 which serve, respectively, to read the contents of memory 28 into the buffer and to increment the lens position register 24. Specifically, the leading edge of pulse 71 is effective to cause the contents of the memory register 28, addressed by the first quantity in the register 24, to be read into memory buffer 31. Before the trailing edge of pulse 71 occurs, the leading edge of pulse 73 occurs and is effective to cause the contents of buffer 31 to be jammed into boundary counter 32. At this instant, counter 32 contains a first quantity which represents the one limit to the focus distance when the lens mount occupies the position at which the sampling occurred.

As shown in FIG. 2, the trailing edge of pulse 71 occurs before the trailing edge of pulse 73 and the trailing edge of pulse 71 is effective to cause lens position register 24 to be incremented. That is to say, after the trailing edge of pulse 71 occurs, a second quantity different from the first quantity appears in register 24, the second quantity representing a position of the lens mount adjacent from the position occupied by the lens mount at the instant of sampling. This is indicated in FIG. 4 by pointer 61 which represents the second quantity in register 24. This second quantity is applied to memory address 29 through data lines 27, thereby addressing the memory at a location represented by the quantity in register 24.

The leading edge of pulse 72 then occurs and this leading edge is effective to cause the contents of the memory register addressed by the contents of lens position register 24 to be read into buffer 31 in a manner similar to what occurred on the leading edge of pulse 71. Subsequent to the transfer of data into the buffer 31, the leading edge of pulse 74 causes the contents of buffer 31 to be jammed into boundary counter 33 by reason of the signal appearing in line 35. At this point, counter 33 contains the in-focus distance limit associated with the second quantity in register 24. In other words, referring to FIG. 4, at this instant in time, counter 32 contains the quantity $M_n$ while counter 33 contains the quantity $M_f$ which together, define a focus zone within which the subject must be located in order to be in focus when the lens mount occupies its position at the instant of sampling. Actually at this time, the subject may be located at any distance from the camera since the purpose of comparator device 19 is merely to relate the actual subject distance to the focus zone.

After each of counters 32, 33 receive the data from memory 28, control circuit 20, as indicated in line (i) of FIG. 2, gates the output of clock 45 into these counters for the purpose of decrementing them. Clock 45 may be a linear clock whose pulse repetition rate is constant for timing the interval between transmission of a burst and receipt of an echo; or, clock 45 can be a scaled clock for the purpose of minimizing the required memory and/or increasing the accuracy of the system.

In order to reduce the size of the memory (i.e., the number of cells in each register), and to give sufficient resolution for subjects relatively close to the camera, a scaled clock can be used instead of a linear clock for decrementing boundary counters 32, 33. A scaled clock is one that produces a train of pulses having a non-uniform pulse repetition rate functionally related to the slope of the lens position/subject distance curve which relates subject distance to the position of the lens at which a subject will be in focus. Such curve, which is indicated schematically at 55 in FIG. 4, can be approximated by a coarse, piece-wise linear approximation following the disclosure in U.S. Pat. No. 4,199,244. In such case, the pulses produced by the scaled clock will be non-uniformly spaced as a function of time. That is to say, the frequency will be relatively high initially and then decrease after predetermined periods of time corresponding to discrete break points in the piecewise linear approximation of the curve 55.

Counters 32 and 33 produce an output whenever the quantities reach ZERO or become negative. The outputs of these counters are applied to respective flip flops 48, 49 as indicated in FIG. 1 at the instant echo pulse 75 appears in line 50. The state of these flip flops will thus depend on the inputs at the instant an echo pulse appears as indicated in FIG. 2. The time interval, or the number of pulses between the gating of the clock into counters 32, 33 and the occurrence of an echo is a measure of the actual distance of the subject from the camera. Thus, when the echo pulse appears in line 50, a comparison can be made between the actual distance of the subject and the focus zone as defined by the contents of counters of 32 and 33.

Three possible conditions exist with respect to the actual subject distance and the focus zone. These conditions are illustrated in FIG. 3: in condition A, the subject is located between the camera and the near boundary represented by contents of counter 32; in condition B, the subject is located within the focus zone; and in condition C, the subject is located farther from the camera than the far-boundary as represented by the contents of counter 33. Condition A will occur when $d < B_n < B_f$ where d is the actual distance of the subject from the camera as determined by the number of pulses produced by clock 45 in the interval between when this clock is gated into the counters and the occurrence of an echo, $B_n$ is the distance of the near-boundary to the camera as represented by the contents of counter 33. In condition A, the number of clock pulses in the interval between the gating of the clock into the boundary counters and the receipt of an echo will be less than the contents of either counter. Consequently, upon receipt of the echo pulse, the contents of each of counters 32 and 33 will exceed ZERO. The occurrence of the echo pulse will cause flip flops 48 and 49 to determine whether either of counters 32, 33 have outputs; and in condition A, neither will have an output. Consequently, the state of the flip flops will not change and the state of focus memory 46 will remain 00. In condition B, $B_n < d < B_f$ which is to say that the subject is within the focus zone. When the echo pulse is received, under this condition, counter 32 will have been counted through ZERO or will be negative while counter 33 will still be positive. The echo pulse causes flip flops 48, 49 to respond to the state of counters 32, 33; and as a consequence, flip flop 48 will have an input and will change state, but flip flop 49 will not have an input. As a consequence the state of focus memory 46 will be 10.

Finally, in condition C, $B_n < B_f < d$, which is to say that the subject is beyond the focus zone. When this situation exists, the occurrence of the echo pulse in line 50 will find both counters 32 and 33 incremented below ZERO, whereby each will have an output that will affect the state of flip flops 48, 49. Thus, the echo pulse appearing in line 50 will cause both flip flops 48 and 49 to change state thereby establishing the state of focus memory 46 at 11.

If logic 51 decodes the state 00 of focus memory 46, an output is produced only in line 76, thus enabling drive 52 to the exclusion of the other two drives. LED 77 is thus illuminated thereby signaling the user that, at the instant of sampling of the position of the lens mount, the lens was focused "too far" to have the subject in proper focus. Therefore, the illumination of LED signals the operator to move the lens mount in a direction that shortens the focal length.

Similarly, if logic 51 decodes the state 10 of memory 46, drive 53 only is enabled by the output on line 78 thereby illuminating LED 79 to the exclusion of the other LED's and indicating to the user that the lens mount is at its proper position to focus on the subject. Finally, when the state of memory 46 is 11, logic 51 provides an output on line 80 which enables drive 54 to the exclusion of the other two drives thereby illuminating LED 81 to indicate to the user that the lens mount is focused "too near" and must be moved in a way that will increase the focal length of the lens.

Because the operation described above occurs five times or more per second depending upon the frequency of the output of generator 37, display 47 is updated sufficiently fast for the display to track manual movement of the lens mount by the user. Thus, in operation, the user would merely close switch 38 while sighting the subject through the viewfinder. Depending upon which of LED's is illuminated, the user will know which direction to turn the lens mount to bring the subject into proper focus even though the subject itself can barely be discernable under low ambient light conditions. When the LED's indicate that the focus is satisfactory, the user is assured that the lens mount occupies a position in which a subject will be in focus thereby enabling a sharply focused photograph to be taken.

Figure 5:
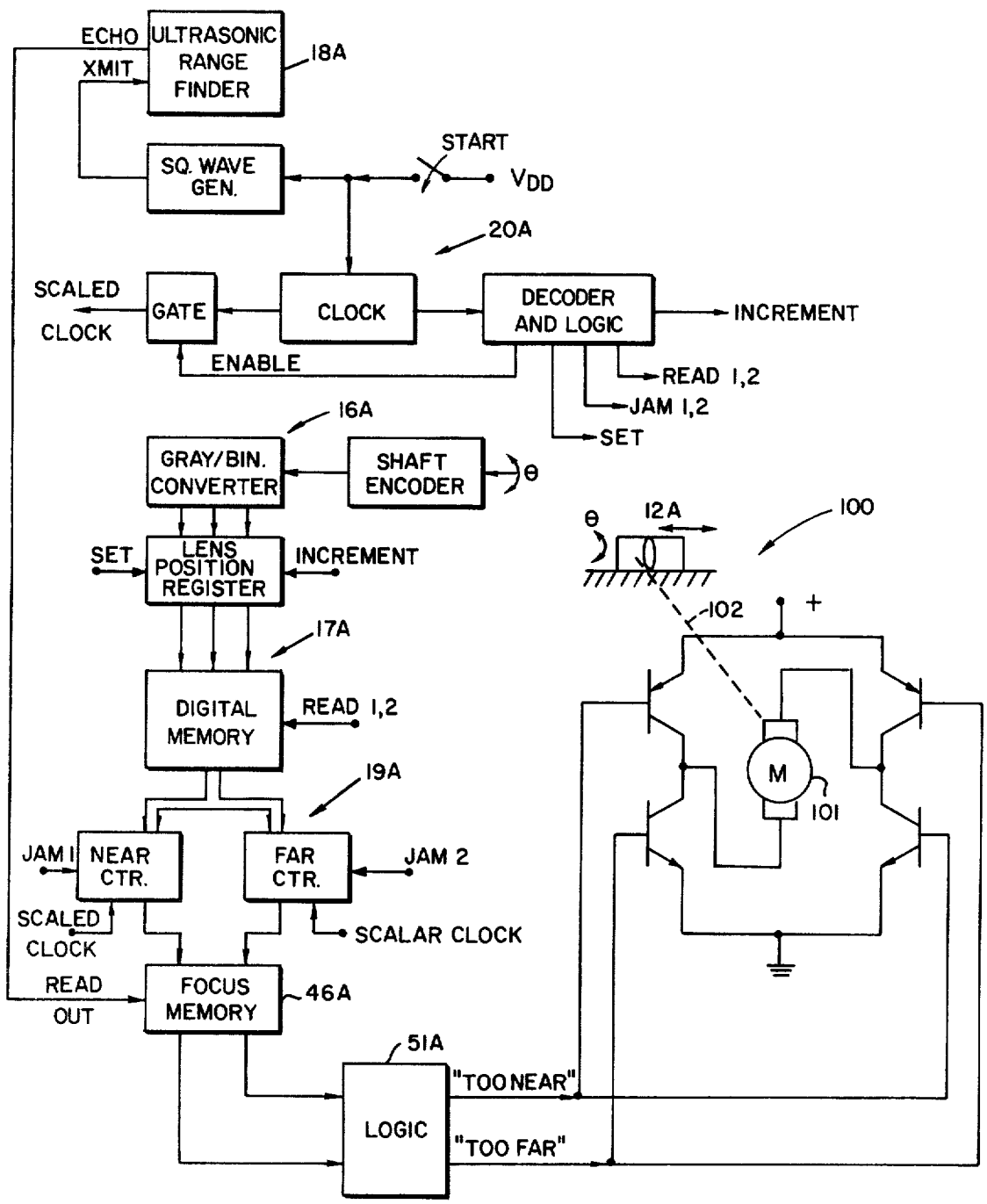
FIG. 5 is a modification of the apparatus shown in FIG. 1 for the purpose of automating the movement of the lens mount.

While manual operation of the lens mount is provided for in the embodiment shown in FIG. 1, the output of logic 51 can also be utilized for the purpose of driving a motor which is operatively connected to the lens mount for the purpose of automating the focusing of the camera. Apparatus for automatically focusing a camera using a modification of apparatus 10 is shown in FIG. 5, and is designated by reference numeral 100. Apparatus 100 comprises lens position sensor 16A, converter 17A, rangefinder 18A, comparator device 19A, and control circuit 20A, each of the components being similar to corresponding components in apparatus 10. In this case, however, focus memory 46A provides an input to logic circuit 51A capable of decoding only the "too near" and "too far" states thus producing error signals that determine the direction of rotation of motor 101 which is mechanically coupled at 102 to lens mount 12A. In other words, a "too near" error signal will power motor 101 to run in a direction that moves lens mount 12A in a direction that increases its focal length. When the lens mount reaches a position at which the resultant focus zone includes the actual subject distance, the error signal ceases and the lens mount remains at a position at which the subject is in focus. A "too near" error signal operates in an opposite way to drive the lens mount to a position at which the subject will be in focus.

To minimize hunting in this system, it is preferred that the motor driven lens move from one focal zone to the next, or through a given zone, at a rate at least slightly slower than the periodic determination of lens position. Thus, motor 101 is arranged to drive the lens slowly enough that it takes longer to progress through a focal zone than the repetition of the lens versus subject comparison so that the drive will be automatically terminated without overshoot of the desired lens position.

To take account of the various interchangeable lens used with a camera, the memory 28 may be compartmented. For example, if four interchangeable lens are available for use on a camera, a two flip flop arrangement can be used for establishing the four states that will uniquely identify the lens. These states are designated as "lens type selection" in FIG. 1 and provide information by which the memory address register 29 selects a particular compartment in memory 28 which is used for reading into buffer 31.

Figure 6:
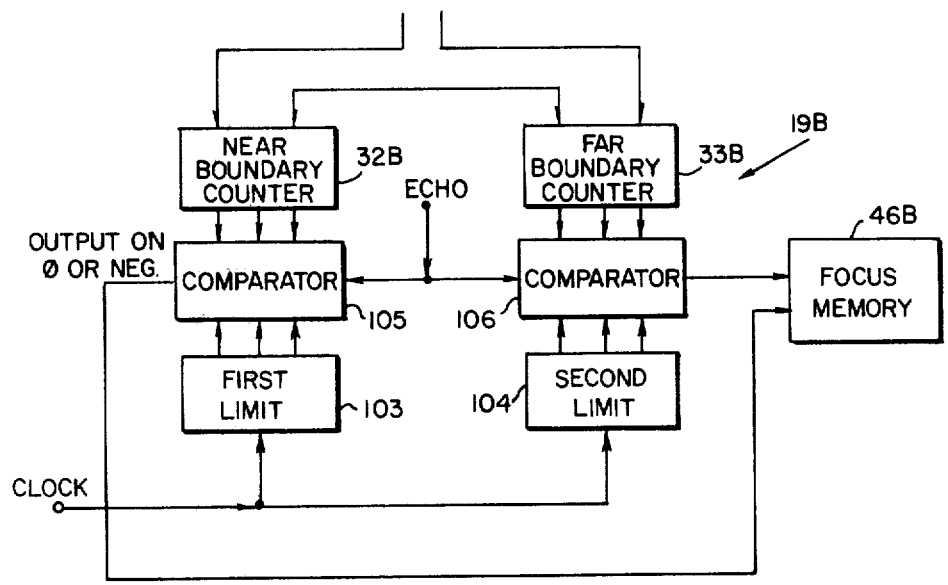
FIG. 6 is a block diagram of a modified comparator device.

Comparator device 19 can also be modified to utilize comparators instead of decremented counters. A suitable arrangement for this purpose is shown for illustrative purposes in FIG. 6 wherein comparator device 19B comprises near- and far-boundary counters 32B, 33B which operate to receive the contents of the memory at two different addresses as in the embodiments described above. In this embodiment, however, the clock applies a train of pulses to limit counters 103, 104 whose contents, upon receipt of an echo pulse, represent the actual subject distance. When an echo pulse is received, comparators 105, 106, respectively compare the contents counter 103 with the contents of counter 32B, and the contents of counter 104 with the contents of counter 33B. Each of the comparators produces an output if the quantity in the boundary counter is equal or less than the quantity in the limit counter.

The output from comparators 105, 106 are applied to focus memory 46B which responds in the same manner as memory 46. The output of memory 46B can be used as in FIG. 1 or FIG. 5.

Finally, the device shown in FIG. 1 can be further modified to provide more than three states. For example, by providing two additional boundary counters, and by progressively incrementing or decrementing the lens position register to establish multiple memory addresses, "much too far" and "much too near" boundaries can also be defined. This arrangement would give the user information on whether his manual change of lens position, in attempting to focus, is in the proper direction.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. In photographic apparatus having a movable lens whose position at which a subject is in focus is a function of subject distance, means for sensing the position of the lens, and ranging means for determining the distance of a given subject from the apparatus, the improvement comprising:
    means for determining, in accordance with the sensed position of the lens, a focal zone defining a range of distances within which a subject must be located to be properly focused when the lens is in the sensed position; and
    means for comparing the subject distance to said focal zone and for providing an error signal indicative of the relationship between the subject distance and said zone.

2. The improvement of claim 1 wherein said means for determining the focal zone representative of the sensed position includes means for defining minimum and maximum subject distances within which a subject will be in focus when the lens is in the position sensed by the sensing means.

3. The improvement of claim 1 including means for repeatedly determining said focal zone in accordance with the present lens position whereby said error signal is automatically repeatedly updated to accommodate movement of the lens.

4. The improvement of claim 3 including means for driving said lens in a direction to reduce the difference between the subject distance and said focal zone at a rate of movement from one zone to the next which is at least slightly slower than the periodic determination of said focal zone.

5. The improvement of claim 1 wherein said zone determining means includes a converter memory providing an output, for each respective input, representing one limit of the focal zone associated with a given lens position represented by that input, first and second storage means for storing the output of the memory, and control means for sequentially addressing the memory with adjacent inputs related to lens position to provide near and far limits of a focal zone, and for storing such limits in the storage means.

6. The improvement of claim 1 wherein said zone determining means includes a converter memory providing an output representing one limit of a focal zone when addressed with a given lens position, first and second storage means for storing the output of said memory, and control means for addressing said memory with the sensed position of the lens and storing the output in said first storage means to thereby provide one limit of the focal zone associated with the lens position and also addressing the memory with an adjacent lens position and storing the output in said second storage means to thereby provide the other limit of the focal zone associated with the sensed position of the lens.

7. Apparatus for facilitating the focusing of a camera having a displaceable lens whose position at which a subject is in focus is a predetermined function of subject distance, the apparatus comprising:
    sensing means for producing an output representative of the position of the lens;
    a converter for converting the output of the sensing means to a representation of the focal zone associated with the output of the transducer, the focal zone being a zone of distances at which a subject will be in focus when the lens occupies the position represented by the output of the sensing means;
    a rangefinder for producing an output representing the actual subject distance; and
    a comparator for comparing the output of the rangefinder with the output of the converter and for producing an output corresponding to the relationship between the focal zone and the actual subject distance.

8. Apparatus according to claim 7 wherein the comparator includes a first storage means, the sensing means includes a lens sensor and a position register associated therewith for producing an output that represents the lens position, and the apparatus additionally includes a control circuit for causing the position register to sample the output of the sensor and to store a first quantity that represents the position of the lens at the instant of sampling, for then causing the converter to convert the first quantity to one limit of the focal zone associated with the lens position and for storing the output of the converter in the first storage means after it converts the first quantity to the one limit of the focal zone associated with the lens position.

9. Apparatus according to claim 8 wherein the control circuit causes the position register to store a second quantity that represents an adjacent lens position, and the comparator device includes a second storage means for storing the output of the converter after it converts the second quantity to the other limit of the focal zone whereby the contents of the first and second storage means define a focus zone within which the subject must be located in order to be in focus when the lens is in the position it occupied at the instant of sampling.

10. Apparatus according to claim 9 wherein the comparator includes comparator means responsive to the output of the rangefinder and the contents of the first and second storage means for determining the relationship between the actual subject distance and the focus zone.

11. Apparatus according to claim 10 wherein the comparator means includes a focus memory with at least two possible states, a "too-far" state indicating that the lens is focused too far relative to the subject when the actual subject distance is less than both limits, and a "too-near" state indicating that the lens is focused too near when the actual subject distance is greater than both limits.

12. Apparatus according to claim 11 including means responsive to the two states of the focus state memory for driving the lens from its position at the instant of sampling toward another position such that the focal zone of the lens position approaches the actual subject distance.

13. Apparatus according to claim 11 wherein the focus state memory has at least three states, one of which is an in-focus state, indicating that the lens is properly positioned to focus on the subject when the lens occupies its position at the instant of sampling and the actual subject distance lies within the two limits.

14. Apparatus according to claim 11 including indicator means responsive to possible states of the focus state memory for producing a visual display of the states.

15. Apparatus according to claim 9 wherein the converter includes a digital memory which at a given address represents one limit of the focal zone of the lens position given by the quantity stored in the position register, and means for addressing the memory with the quantity stored in the position register.

16. Apparatus according to claim 15 wherein the memory includes a buffer, the apparatus includes shift means for reading the contents of the memory at the address specified by the first quantity stored by the position register into the buffer, and jam means for jamming the contents of the buffer into the first storage means whose contents thereafter represents one limit of the focal zone for the lens when it occupies the position at the instant of sampling.

17. Apparatus according to claim 16 wherein the shift means is effective, after the control means causes the position register to store said second quantity, to read the contents of the memory, at the address specified by the second quantity, into the buffer, and the jam means is thereafter effective to jam the contents of the buffer into the second storage means whose contents thereafter represent the other limit of the in-focus distance for the lens when it occupies the position at the instant of sampling.

18. Apparatus according to claim 16 wherein the control circuit includes a strobe means for strobing the contents of the position sensor, which constitutes the first quantity, into the lens position register, the shift means is effective to increment the lens position register when the shift means reads the memory into the buffer whereby the first storage means constitutes a near boundary counter whose contents represent the minimum in-focus distance, and the second storage means constitutes a far boundary counter whose contents represent the maximum in-focus distance.

19. Apparatus according to claim 18 wherein the logic means includes a first flip-flop having a first state only if the contents of the first storage means exceeds ZERO on receipt of the echo, a second flip-flop having a first state only if the contents of the second storage means exceed ZERO on receipt of an echo, a logic circuit responsive to the states of the two flip-flops for producing a first signal that indicates the lens must be moved in one direction when both the flip-flops are in their first state, and for producing a second signal that indicates the lens must be moved in the opposite direction when the flip-flops are in their other states.

20. Apparatus according to claim 19 wherein the apparatus includes a reversible motor operatively connected to the lens mount for moving the same, and a motor control circuit for selectively controlling the operation of the motor and its direction, the motor control circuit being responsive to the first and second signals of the logic circuit.

21. Apparatus according to claim 19 wherein the apparatus includes a control circuit that causes the rangefinder to transmit a plurality of ultrasonic bursts with a period that exceeds the round trip time of an ultrasonic burst for a subject at the largest minimum focus distance obtainable.

22. Apparatus according to claim 19 wherein the first and second storage means comprise first and second counters, and the control circuit includes a clock for generating a train of pulses, means for decrementing the first and second counters with the output of the clock in accordance with subject ranging, and logic means for sampling the contents of the first and second counters and logically determining the position of the subject relative to the focal zone limits.

23. Apparatus according to claim 22 wherein the clock is a scaled clock which generates a train of pulses having a non-uniform pulse repetition frequency at least approximately related to the slope of the function that relates subject distance to the position of the lens at which a subject will be focused.

24. A method for focusing a camera having a displaceable lens whose position at which a subject is in focus is a predetermined function of subject distance, the method comprising:

(a) determining the actual distance of the subject;

(b) sampling the position of the lens and producing two outputs respectively representing the minimum and maximum in-focus distance of the lens which defines the boundary within which a subject must be located in order to be in focus when the lens occupies the position at which the sampling occurs;

(c) comparing the actual distance of the subject with the minimum and maximum in-focus distances; and producing a signal in response to the comparison.

25. A method according to claim 24 including the step of periodically carying out steps (b), (c), and (d) of claim 24.

26. A method according to claim 24 including the step of using the signal produced in response to the comparison step as a visual indication of the error in focusing whereby the lens can be manually displaced in a direction that reduces the error.

27. A method according to claim 24 including the step of using the signals produced in response to the comparison step as an error signal that drives a motor operatively connected to the lens slowly in such a direction as to reduce the error.

28. A method of focusing a variable lens camera in accordance with subject distance, the method comprising the steps of:

determining the lens position and in accordance therewith defining a zone of distances within which a subject will be in focus when the lens is in the determined position;

determining the distance between the camera and a subject;

comparing the defined zone to subject distance; and in response to said comparing step, producing an error signal indicating the direction of lens movement necessary to provide a lens position suitable for the given subject distance.

* * * * *